April 26, 1955 K. CALDWELL 2,706,877
STONE PICKER
Filed Sept. 22, 1952
FIG. 1
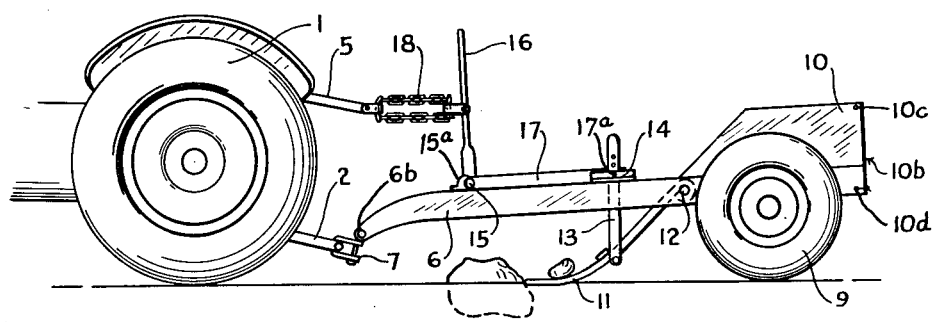
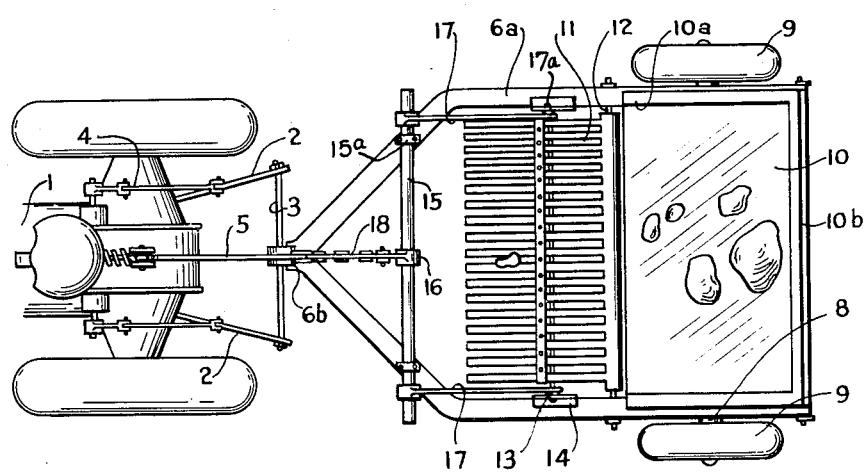
FIG. 2
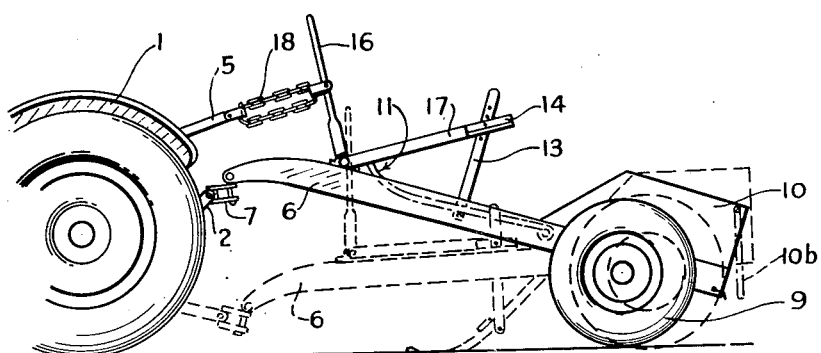
FIG. 3
Inventor
KENNETH CALDWELL
by W. Irwin Haskett
Attorney

United States Patent Office 2,706,877
Patented Apr. 26, 1955

2,706,877
STONE PICKER
Kenneth Caldwell, Shanty Bay, Ontario, Canada
Application September 22, 1952, Serial No. 310,789

2 Claims. (Cl. 55—17)

This invention relates to improvements in a stone picker for use with a tractor, of the so-called "Ferguson" three link type, and appertains particularly to one having a novel mechanism for operating the rake.

An object of the invention is to provide a simplified and efficient stone picker in which the rake is tipped automatically when the tractor drawbar is raised.

A further object of the invention is to provide a stone picker, for connection to a so-called "Ferguson" three link type tractor, wherein the rake mechanism is free to lift independently.

A still further object of the invention is the provision of an implement of the nature and for the purpose set forth that may be hauled and operated with ease; the rocks collected by the rake being dumped into the box or receptacle by a simultaneous upward hinging of the rake and rearward tipping of the implement, both caused by the raising of the front of the implement by the tractor drawbar.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a side elevation of a preferred embodiment of the invention attached to a so-called "Ferguson" three link type tractor.

Figure 2 is a plan view thereof; and

Figure 3 is a side elevation, similar to Figure 1, showing the implement tipped to dump the rake.

While useable with any tractor having a power lifted drawbar, the invention is here shown connected to a "Ferguson," three link type tractor 1 having a laterally spaced pair of pulling links 2, connected by a cross bar 3 and power raised by the arms and links 4, and a top or pushing link 5 that is located substantially above the power lifted, drawbar assembly 2—3—4.

The stone picker comprises a channel iron frame 6 of generally rectangular shape with opposite sides 6a converging at the front to provide a draft tongue 6b that carries a clevis 7 for coupling with the tractor bar 3. The frame is supported near the rear by a cross axle 8 and pair of wheels 9 and arranged thereover is an open fronted box or receptacle 10 with side walls 10a and a gate 10b hingedly connected by pivots 10c at the back, such gate being normally secured in closed position as by hooks 10d. It will thus be seen that the raising of the tractor drawbar 3 will cause the wheel-carried frame 6 to teeter on its wheels 9, as shown in Figure 3.

A stone collecting rake member 11 is disposed transversely of the implement, just ahead of the receptacle 10, being hinged at its upper end on a frame carried rod 12, from which it declines forwardly. From a point intermediate of the length of said rake and on each side of it, a link 13 rises inside of and above the frame 6, being pivotally connected at its lower end to said rake. A laterally projecting angle iron 14 carried by each link overlies the frame and engages the upper side thereof to limit the downward movement of said rake.

The mechanism for hinging the rake 11 to dump the stones collected by it into the receptacle 10 comprises a bell crank mechanism tethered to the tractor 1, and in the present embodiment is shown as connecting with the top link 5. The bell crank consists of a cross shaft 15 rotatably supported in bearings 15a mounted on the frame 6 near the front thereof, with a lever 16 rising centrally therefrom and an arm 17 extending rearwardly from each end of said shaft and pivotally connected by a pin 17a with the respective link 13 near the top. The connection between the upstanding lever arm 16 and the tractor top link 5 preferably includes a flexible member such as the chain 18 here shown so that if the rake should strike a boulder or such obstruction, it may lift and ride over such obstruction with the links 13 rotating the bell crank lifting device and the connecting chain 18 merely slackening.

In operation, when a sufficient number of stones have accumulated on the rake, the power lift drawbar 3 of the tractor is operated raising the front end of the frame 6 and teetering the device on its wheels. This teetering acts to swing the upright bell crank lever 16 away from the tractor so that the tethering connection of the tractor upper link 5 and the chain 18 exert a pull on it, causing the bell crank mechanism to rotate on its shaft 15 with the raising of the arms 17 and upward hinging of the rake 11 by the links 13. It will also be noted that in this novel structure and arrangement the dumping of the rake occasioned by the bell crank device is augmented by the tilt imparted to the whole frame as it teeters so that the rotation of the rake is the total of the frame teetering and the rake hinging, as will be clearly seen on reference to Figure 3.

For emptying the box or receptacle as desired, the implement is dumped in the same way, with the box gate 10b released.

From the foregoing description taken in connection with the accompanying drawings, it will be manifest that a stone picker is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. For a tractor having a power lift type drawbar, a stone picker comprising a substantially rectangular frame with the opposite sides converging at the front to form a draft tongue hingeably connectible with the tractor drawbar; a cross axle and pair of wheels supporting the frame near the rear thereof on which said frame teeters when the draft tongue is raised by the tractor's power lifted drawbar; an open fronted receptacle superposing said frame over said axle and wheels; a rake hinged to said frame immediately ahead of said receptacle and declining forwardly from the open front thereof; a pivotally connected link rising from each side of said hinged rake with a laterally projecting stop engageable with the upper side of said frame and designed to limit the downward hinging of said rake while allowing the rake freedom to hinge upwardly; a rake dumping means consisting of a bell crank lever mechanism rotatably mounted on said frame forwardly of said rake with an upstanding lever arm and a spaced pair of rearwardly extending arms pivotally connected to said links; and a substantially horizontal tether member running directly from said upstanding lever arm to said tractor; dumping means operating on the longitudinal separation of the upstanding lever arm of the bell crank from the tractor as the stone picker frame teeters when the tractor drawbar is raised.

2. The combination with the structure set forth in claim 1, of a flexible element in the tether member connection between the upstanding lever arm of said bell crank mechanism and the tractor, whereby the said bell crank mechanism is free to rotate under lifting impetus of the links from the hinged rake should the rake strike a large boulder.

References Cited in the file of this patent
UNITED STATES PATENTS

| | | |
|---|---|---|
| 1,625,560 | Morris | Apr. 19, 1927 |
| 1,713,952 | Darr | May 21, 1929 |
| 2,514,091 | Renaud | July 4, 1950 |
| 2,569,719 | Huhne | Oct. 2, 1951 |

FOREIGN PATENTS

| | | |
|---|---|---|
| 567,244 | Great Britain | Feb. 5, 1945 |